United States Patent [19]
Seo

[11] Patent Number: 5,656,803
[45] Date of Patent: Aug. 12, 1997

[54] ENCODED SYMBOL READER

[75] Inventor: Shuzo Seo, Tokyo, Japan

[73] Assignee: Asahi Kogaku Kogyo Kabushiki Kaisha, Tokyo, Japan

[21] Appl. No.: 419,540

[22] Filed: Apr. 10, 1995

[30] Foreign Application Priority Data

Apr. 11, 1994 [JP] Japan .................. 6-096943
Feb. 3, 1995 [JP] Japan .................. 7-039055

[51] Int. Cl.⁶ ...................................... G06K 7/30
[52] U.S. Cl. ............................ 235/472; 235/462
[58] Field of Search ...................... 235/454, 462, 235/472, 467, 463; 282/59; 359/888

[56] References Cited

U.S. PATENT DOCUMENTS

| | | | |
|---|---|---|---|
| 4,210,802 | 7/1980 | Sakai | 235/462 |
| 4,818,856 | 4/1989 | Matsushima et al. | 235/472 |
| 5,285,056 | 2/1994 | Tadesco et al. | 235/472 |
| 5,369,262 | 11/1994 | Dvorkis et al. | 235/472 |
| 5,428,212 | 6/1995 | Taniet et al. | 235/472 |
| 5,436,688 | 1/1996 | Lima et al. | 235/472 X |

FOREIGN PATENT DOCUMENTS

| | | | |
|---|---|---|---|
| 0094383 | 4/1988 | Japan | 235/462 |
| 0292484 | 11/1989 | Japan | 235/462 |

*Primary Examiner*—Donald T. Hajec
*Assistant Examiner*—Thien Minh Le
*Attorney, Agent, or Firm*—Greenblum & Bernstein P.L.C.

[57] ABSTRACT

An encoded symbol reader has a reading head with guide or positioning members extending therefrom. The guide members are arranged to expose an encoded symbol to an operator when the reader is being positioned. When the complete symbol is readable by the reader, the symbol is always completely visible to the operator. The symbol may be read by the reader even if located beyond outside an area delimited by the guide members.

19 Claims, 12 Drawing Sheets

ENCODED SYMBOL READER

BACKGROUND OF THE INVENTION

The present invention relates to encoded symbol readers used to decode encoded symbols such as two dimensional tessellated codes.

Modern point-of-sale systems employ encoded symbol readers to scan product bar-code labels, thereby increasing processing speed at store check-outs. However, conventional bar-code labels are scanned in only one dimension (i.e., a single scanning direction), and the bar-codes can only encode a small amount of data. More recently, a new type of symbol for representing data in two directions has been proposed. This new type of symbol (hereinafter referred to as a tessellated code) uses a two-dimensional tessellated pattern to represent data.

A relatively simple scanning process is employed for conventional (single-direction) bar-codes, in which the angle between the reference surface on which the bar code is printed and the encoded symbol reader is not critical. Similarly, the distance between the printed bar-code and the light receptor of the encoded symbol reader is not critical.

If a simple scanning method is used to read tessellated codes, the positioning of the encoded symbol reader is crucial for decoding the appropriate information. If the surface bearing the tessellated code and the image receiving element are not aligned properly, the received image may be distorted and the wrong information decoded. Furthermore, the distance from the tessellated code to the light receptor of the encoded symbol reader is best kept constant to properly decode the tessellated code. Positioning the encoded symbol reader is difficult if the tessellated code is not printed on a surface that is both flat and in a level position.

An area sensor has been developed for the encoded symbol reader in order to read the two-dimensional symbols. The area sensor scans the entire tessellated pattern simultaneously, in essence taking a "snapshot" of the encoded symbol. Alternatively, a line sensor may be used, where each line of encoded dots of the tessellated code is main scanned along the line, and auxiliary scanned from line to line. However, either type of encoded symbol reader must be positioned at a specific distance and angle (within certain tolerances) with respect to the tessellated code. An example of a known encoded symbol reader employing this type of area sensor is shown in FIG. 1.

Figure 1:
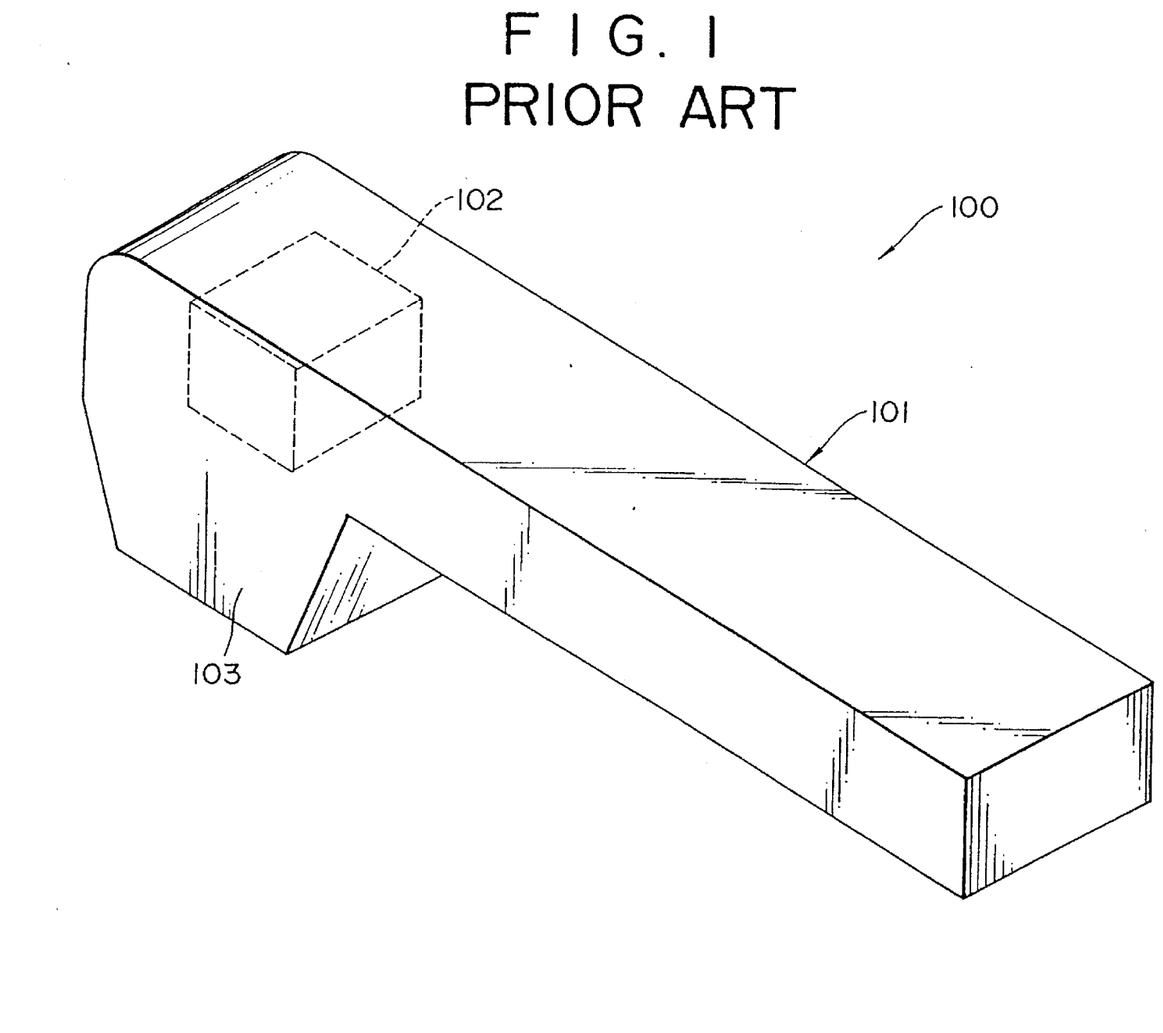
FIG. 1 shows an encoded symbol reader according to the prior art.
Figure 2:
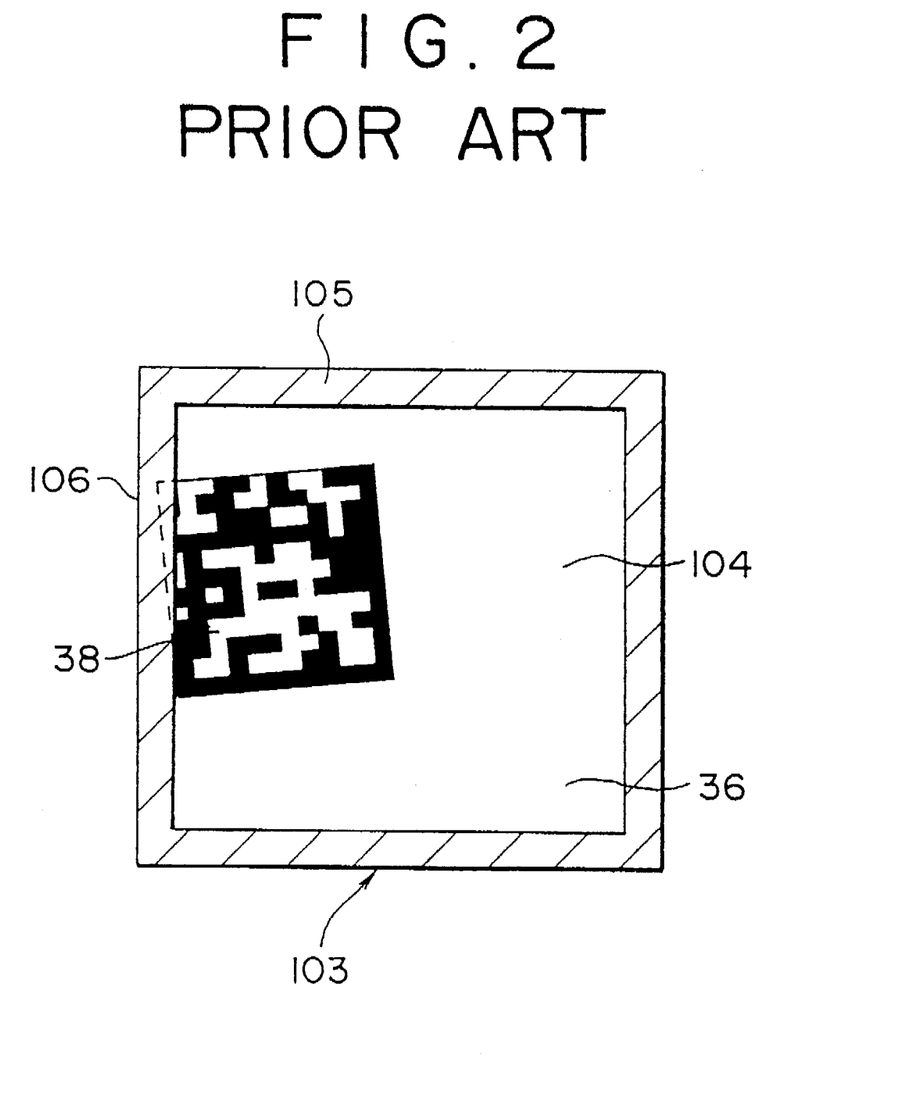
FIG. 2 shows a top sectional view of a reading window of an encoded symbol reader according to the prior art when reading an encoded symbol.

FIG. 1 shows an encoded symbol reader 100 including a main body 101 and a reading head 103. The reading head 103 houses a reading module 102. FIG. 2 shows a top view of an window 104 formed in the reading head 103. The window 104 is a physical space defined by the walls 105. A reading field 36 is defined within the window 104, delineating an area in which the encoded symbol may be read. The reading field 36 is a virtual space defined by the field of view sensable by the reading module 102.

As shown in FIG. 2, part of the encoded symbol 38 maybe covered by the rectangular wall 105, but still inside the outer peripheral surface 106 of the reading head 103. The user may thus assume that the entire symbol 38 is readable by the reader 100, yet proper decoding of the symbol 38 is not possible. Further, even if the rectangular wall 105 is a translucent material, it is still difficult to ensure that the symbol 38 is within the reading field 36.

SUMMARY OF THE INVENTION

It is therefore an object of the present invention to provide an encoded symbol reader which can decode an encoded symbol quickly and precisely, and that enables an operator to ensure that the reader is properly positioned before reading a symbol.

The object is met by the invention by providing a symbol, reader for reading two-dimensional encoded symbols including an imaging system for receiving and decoding an encoded symbol housed in a body and having at least one positioning member extending from the body. The positioning member (or members) extending from the reading head contact to a reference surface bearing the encoded symbol, and the member defines a predetermined distance between the reference surface and the imaging system. The reader also exposes the encoded symbol to an operator's direct view when the positioning member contacts the reference surface and the imaging system receives the image of the encoded symbol. In this manner, the symbol is always visible to a user, while the symbol reader is positioned precisely with reference to the surface upon which the encoded symbol is to be read by using the positioning guide member (or members). Preferably, the symbol reader includes a light source and a light receiving element to provide illumination and receive light reflected by the symbol. Further, the symbol reader preferably includes a signal processing circuit associated with the light receiving element and a light source driving circuit, to drive the respective elements.

In another aspect of the invention, a pair of parallel elongated ribs are provided as positioning members to the body. In this case, the pair of parallel elongated ribs have two openings formed therebetween, at opposite ends of the pair of parallel elongated ribs. The encoded symbol can be viewed by a user through either or both of the openings when the pair of parallel elongated ribs contact the reference surface. Preferably, the body includes a handle portion. In this case, when the body is parallel to the reading area, the elongated ribs are arranged parallel to the reading area. The openings expose parallel sides of the encoded symbol, so that the encoded symbol may be viewed from either side.

In yet another aspect of the invention, four parallel columnar legs to the body serve as positioning members. In this case, the columnar legs have four openings formed therebetween (between adjacent pairs of columnar legs), and the encoded symbol can be viewed by a user through any of the four openings when the columnar legs contact the reference surface. In this case, the encoded symbol is viewed easily from any side of the reader when reading encoded symbols.

According to still another aspect of the invention, the imaging system has a predetermined reading area in which an encoded symbol is readable. The positioning member (or members) define a predetermined distance from the encoded symbol to the imaging system. The symbol reader is further provided with an opening extending between the main body and the reference surface and in a plane normal to the reference surface. The encoded symbol is visible through the opening. The reading area can be so extended depending on the magnification of an optical system in the reading head, and on the size and shape of an image receiving element. The encoded symbol can be read by the imaging system through the opening or openings when the positioning member or members contact the reference surface. If the reader is arranged to have two elongated ribs as positioning members, then the reading area extends outside the reading head and past the two side openings in the reading head. If the reader is arranged to have four columnar legs as positioning members, then the reading area extends outside the reading head and past all four openings in the reading head.

In this case, a portion of an image receiving element of the imaging system is preferably masked to cover unused portions. The masking allows simpler image processing control as stray light cannot add extraneous data at the edges of the reading area.

In still yet another aspect of the invention, the symbol reader includes an imaging system able to receive and decode an image of an encoded symbol and housed in a body, where the imaging system has a predetermined reading area. A positioning member extends from the body, a predetermined distance from the encoded symbol to the imaging system. The reader can also extend the reading area outside the body and beyond the positioning member. In this case, the encoded symbol can be read by the imaging system outside the body and beyond the positioning member when the positioning member contacts the reference surface. Thus, even though the operator may have a problem with parallax error when positioning the reader, the encoded symbol can be read by the reader even outside the physical limits of the reader's body and positioning member.

DESCRIPTION OF THE EMBODIMENTS

Figure 3A:
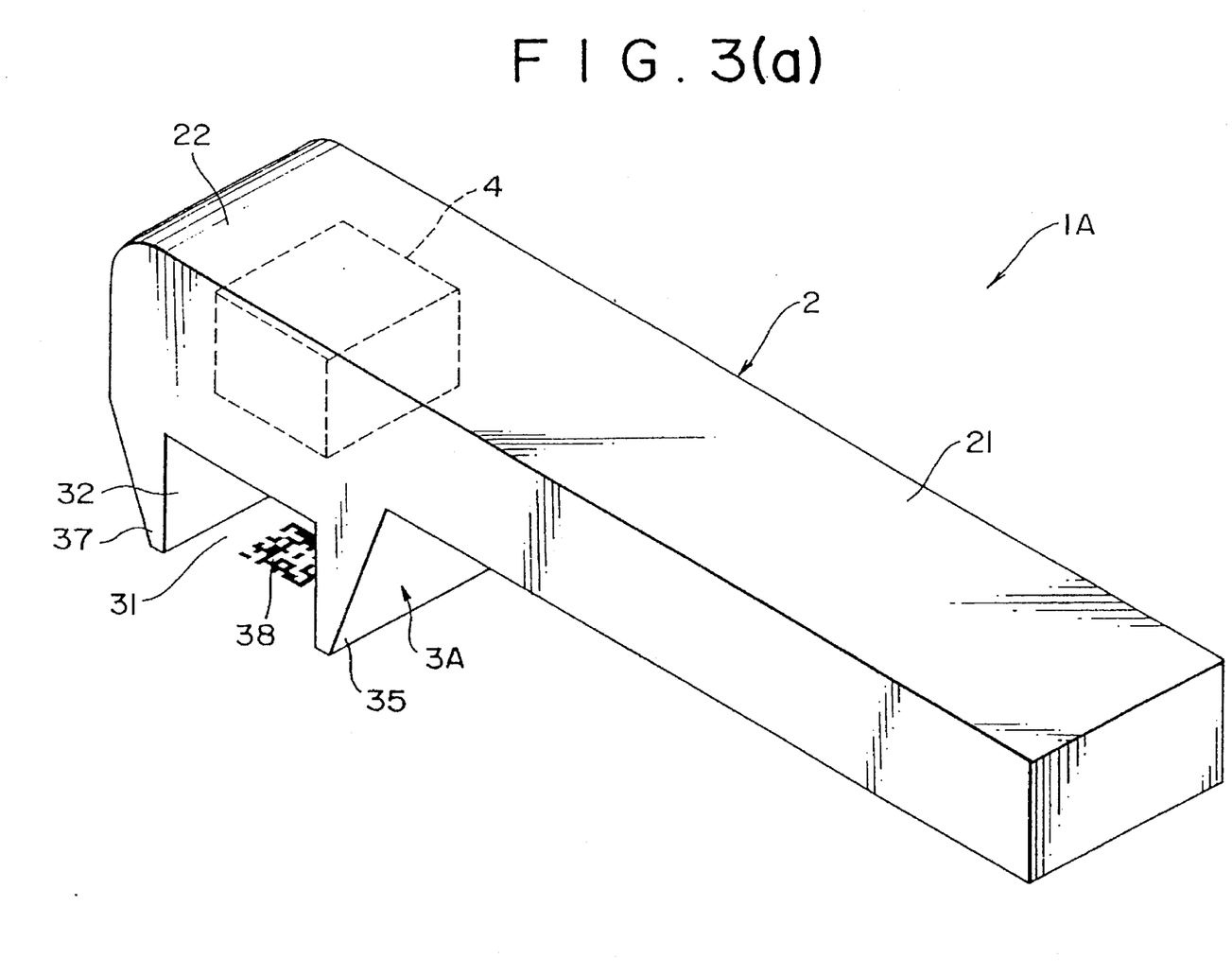
FIG. 3(a) shows an encoded symbol reader according to a first embodiment of the present invention.

FIG. 3 (a) shows a perspective view of the encoded symbol reader 1A according to a first embodiment of the present invention.

The encoded symbol reader 1A consists of a main body 2 and a reading head 3A. The main body 2 has a casing 21 made of synthetic resin or metallic materials. The main body 2 is usually held in the hand of a user and encloses the main decoding circuitry (shown in FIG. 4, described later).

As shown in FIG. 3(a), a reading module 4 is housed in the reading head 3A for illuminating the encoded symbol 38, sensing the image of the encoded symbol 38, and outputting an electrical signal corresponding to the sensed image. The reading module 4 includes (shown in FIG. 4) a light source, a receiving element 43, and an optical system 44. The optical system 44 guides light reflected from the encoded symbol 38 towards the receiving element 43 to form an image thereon. In this first embodiment, the receiving element 43 is a charge coupled device (CCD, hereinafter referred to as CCD 43). The light source consists of two illuminating devices 41, 41 and is controlled by a light source driving circuit 42. In this embodiment, the two illuminating devices 41, 41 are light emitting diodes (LEDs, hereinafter referred to as LEDs 41, 41). However, laser diodes or halogen lamps may alternatively be used as a light source.

Figure 4:
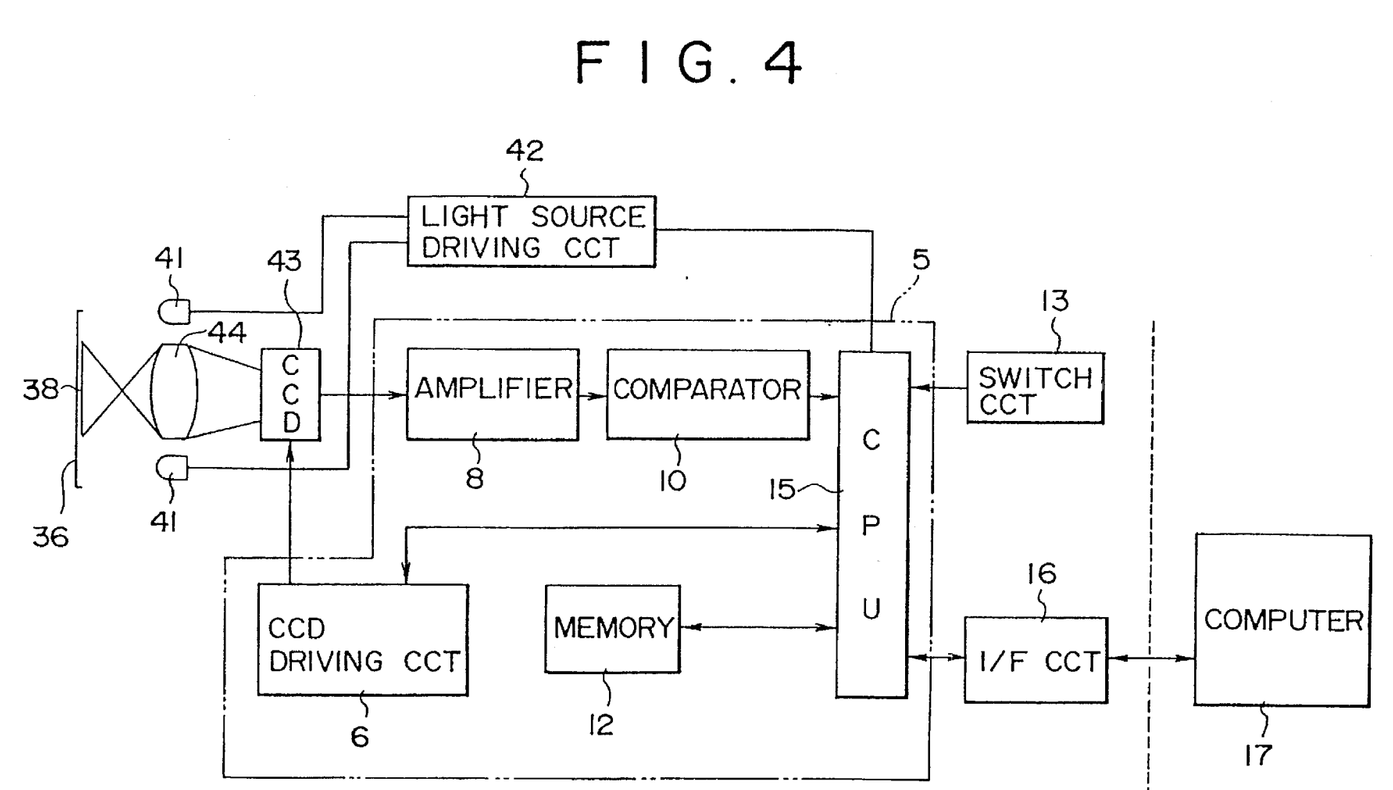
FIG. 4 shows a block diagram representing an encoded symbol reader.

As shown in FIG. 4, the CCD 43 and the optical system 44 are positioned between the two LEDs 41, 41. In this first embodiment, the CCD 43 is a two dimensional receiving device, having receiving pixels in both the X and Y directions to form a matrix. Electric charges corresponding to light incident on each pixel are stored in the CCD 43 and read out sequentially. In this first embodiment, the CCD 43 needs merely to distinguish brightness levels, since the encoded symbol 38 consists of black and white areas. Alternatively, if color symbols are to be read, a color-sensing CCD (or CCDs) may be employed. The optical system 44 can be formed by suitably combining lenses, prisms, filters, or other optical elements.

FIG. 4 shows a block diagram representing the operational parts of encoded symbol reader 1A. The main body 2 encloses a signal processing circuit 5, a switch circuit 13 and an interface circuit 16. Signal processing circuit 5 controls the operation of the reading module 4 (shown in FIGS. 3(a) and 3(b)). The signal processing circuit 5 consists of a CCD drive circuit 6, an amplifier 8, a comparator 10, a memory 12 and a CPU 15. The CPU 15 sends a control signal to the light source driving circuit 42 to illuminate an encoded symbol 38. The CCD 43 scans encoded symbol 38. The CCD drive circuit 6 then has CCD 43 output image information, pixel by pixel, corresponding to the detected image, as an analog signal to the amplifier 8. The amplifier 8 amplifies each said and feeds the signal to comparator 10. The comparator 10 compares the input signal with a predetermined threshold signal and outputs either a high or low signal (i.e., a binary signal) to the CPU 15. The CCD driver 6 outputs a clock signal to the CPU 15 and ensures synchronous transfer of the data from the CCD 43 to the CPU 15.

The binary data is stored at predetermined addresses in the memory 12 using an address counter (located in the CPU 15) driven by the clock signal output from the CCD driver 6. The data is then sequentially read out from the memory 12 to CPU 15 using the address counter of the CPU 15. For one picture frame of data, an arithmetic logic unit (ALU) of the CPU 15, can perform image processing, e.g., detection of the outline of the symbol 38, detection of dropouts in the signal representing the symbol 38, and detection of the rotational orientation of the symbol 38. Further, the CPU 15 can decode the data corresponding to the encoded symbol 38. The decoded data is output to a computer 17 through an interface circuit 16.

Figure 5A:
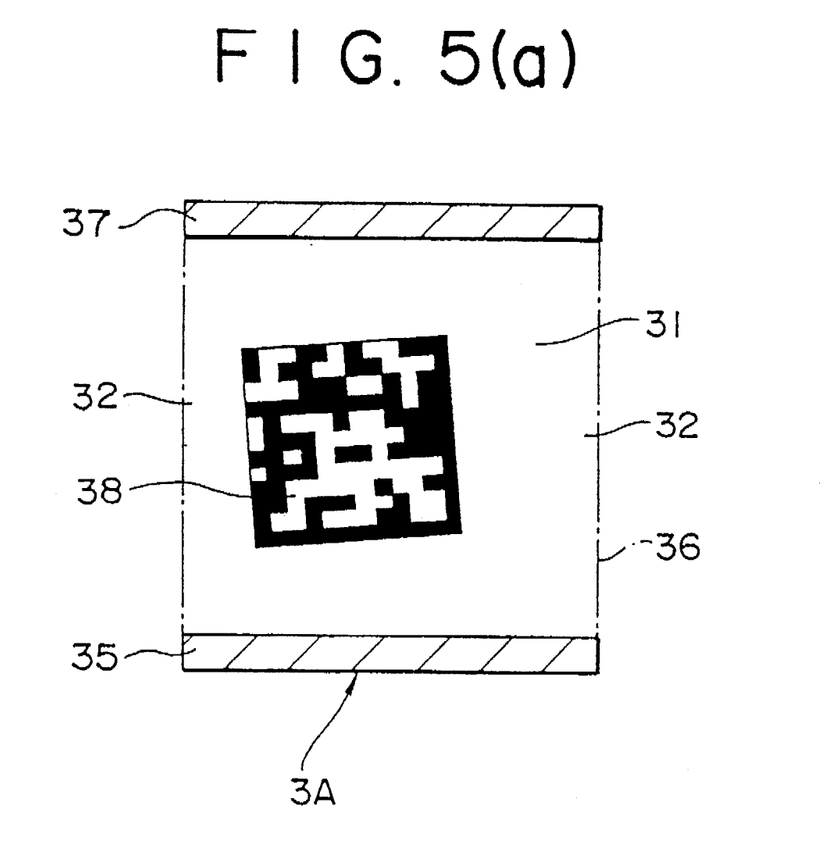
FIG. 5(a) shows a top view of a reading window of the encoded symbol reader of FIG. 3(a) when reading an encoded symbol.

As shown in FIGS. 3(a) and 5(a), the reading head 3A includes rectangular ribs 35 and 37. The rectangular ribs 35, 37 define a slot window 31 (open at side openings 32, 32) including the reading field 36, as shown in FIG. 5(a). The rectangular ribs 35, 37 protrude from reading head 3A such that when the tips contact a reference plane on which the encoded symbol 38 is placed, an image of the encoded symbol 38 will focus on the CCD 43. The rectangular ribs 35, 37 serve as guide members to define the correct distance between the reading module 4 and the encoded symbol 38. The tips of the rectangular ribs 35, 37 are used to properly position the encoded symbol reader 1A relative to the encoded symbol 38.

In the first embodiment the reading field 36 (the sensing area) is substantially the same size as the slot window 31 (the physical limits between the ribs 35, 37). However, the reading field 36 may be smaller than the slot window 31. When positioning the reading head 3 to read the encoded symbol 38, accurate placement of the reading head 3 is quickly established since the encoded symbol 38 can be seen through the side openings 32, 32 between the ribs 35, 37.

Although the use of the ribs 35, 37 allows the user to see the encoded symbol 38 when positioning the reader 1A, the user may encounter some parallax error, where it is difficult for the user to detect the boundaries of the slot window 31. In this case, a second embodiment uses an optical system 44 and CCD 43 arranged such that the reading area 36 extends beyond the slot window 31, so that the reading module 4 can read the symbol 38 when it is outside of the slot window 31.

Figure 3B:
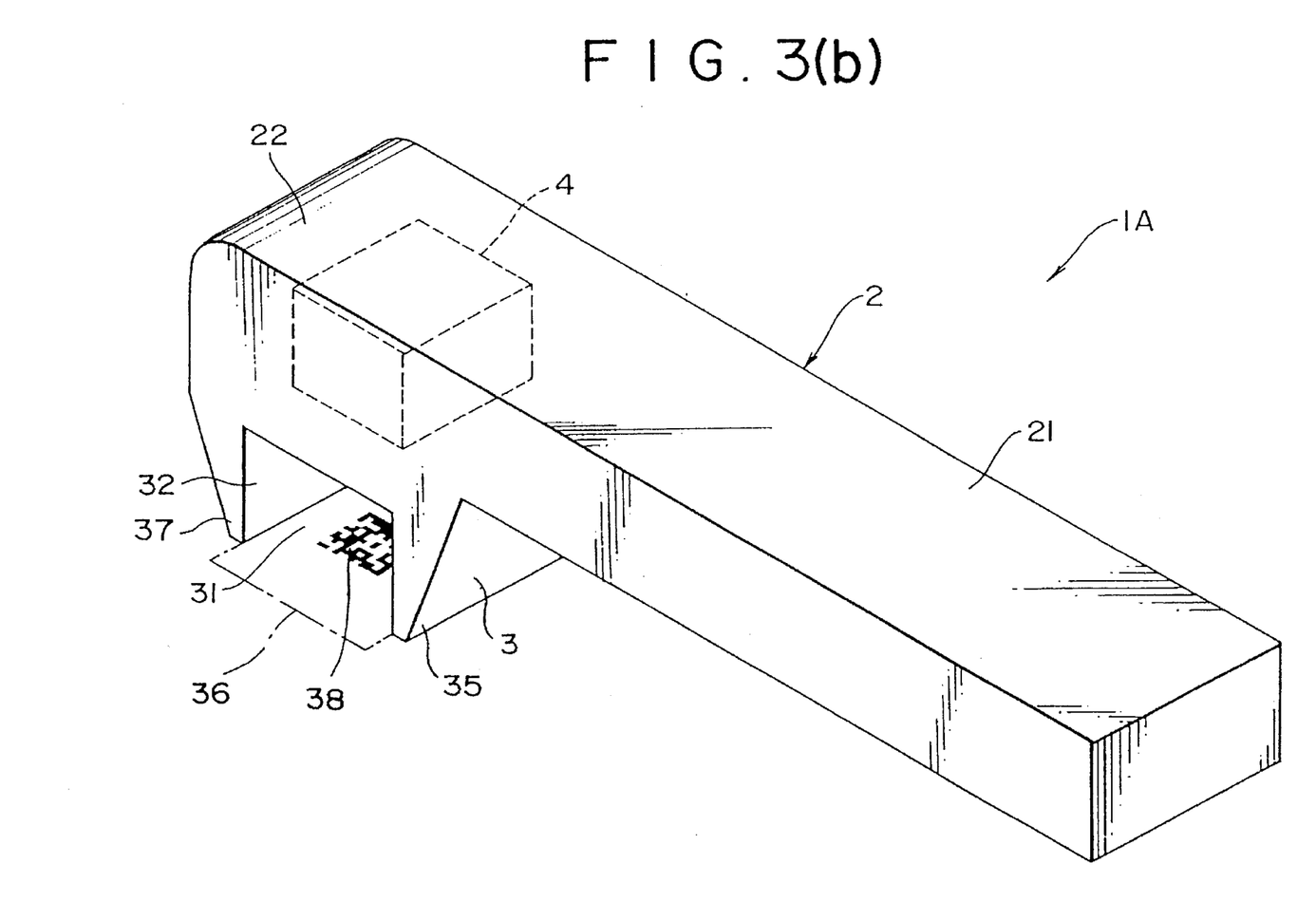
FIG. 3(b) shows an encoded symbol reader according to a second embodiment of the present invention.
Figure 5B:
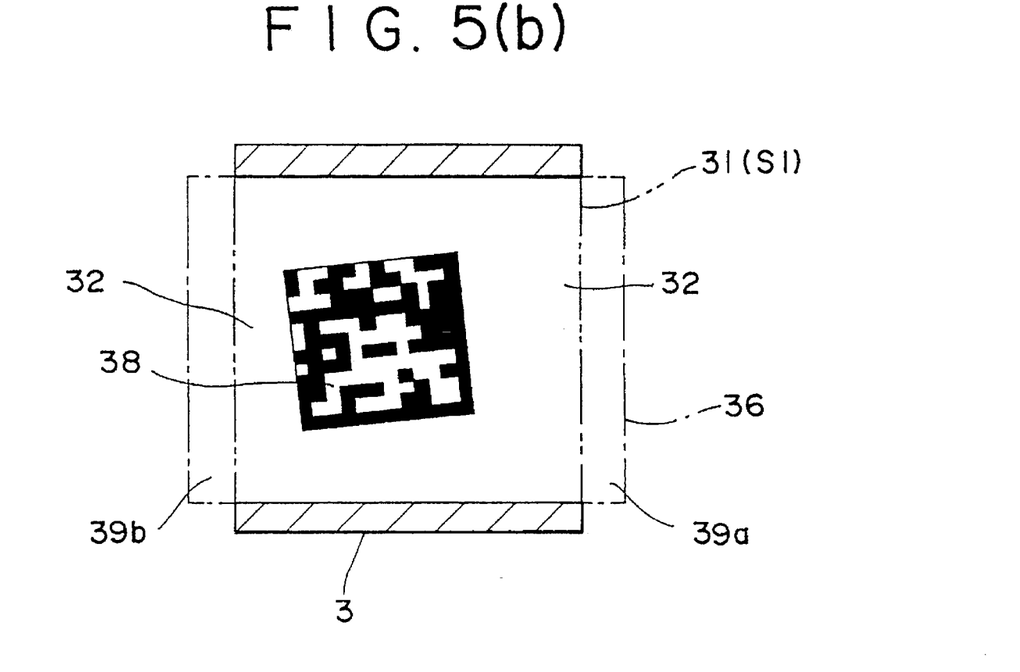
FIG. 5(b) shows a top view of a reading window of the encoded symbol reader of FIG. 3(b) when reading an encoded symbol in a first condition.
Figure 5C:
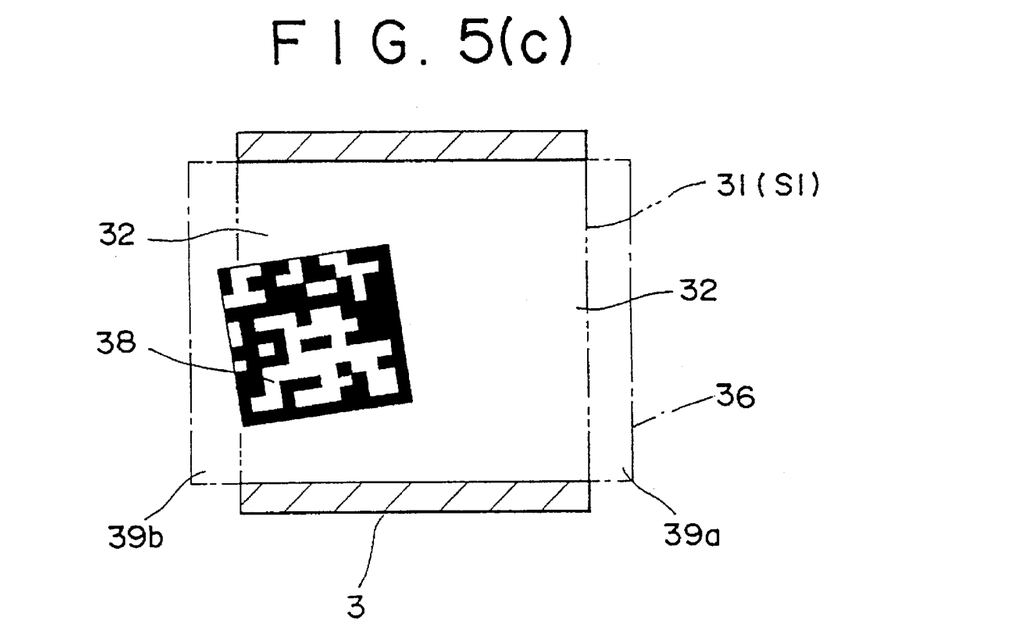
FIG. 5(c) shows a top view of the reading window of the encoded symbol reader of FIG. 3(b) when reading an encoded symbol in a second condition.

The second embodiment is shown in FIG. 3(b). As shown in FIGS. 3(b), 5(b), and 5(c). Area S1 corresponds to the size of the slot window 31, and is defined by an area enclosed by the ribs 35, 37 and side openings 32, 32, having a normal line corresponding to an optical axis of the optical system 44. In this second embodiment, the reading field 36 (the sensing area) extends beyond the area S1 and side openings 32, 32, to supplementary reading areas 39a and 39b. The limits of the reading area 36, including the supplementary areas 39a and 39b, are shown in FIGS. 5(b) and 5(c) by lines having a single intermittent dash, while the limits of the slot window 31 (area S1) are shown by lines having a double intermittent dash.

In the second embodiment of an encoded symbol reader 1A, the encoded symbol 38 is read similarly to the first embodiment as shown in FIG. 5(b). However, the symbol 38 can be read by the second embodiment even when the encoded symbol is outside the physical slot window 31 (area S1), as long as the encoded symbol 38 is at least within one of the supplementary reading areas 39a or 39b, as shown in FIG. 5(c). In this case, the magnification of the optical system 44 and the dimensions of the CCD 43 are adjusted to expand the reading area 36 beyond the slot window 31 (area S1). More particularly, the magnification of the optical system 44, the dimensions of the CCD 43, and the area S1 are adjusted such that the value obtained by dividing the actual longitudinal length of the light-receiving surface of the CCD 43 by the image magnification of the optical system 44 is larger than the longitudinal length of the area S1.

For example, if the dimensions of the area S1 are 4 cm×4 cm, those of the CCD 43 are 1 cm×1.5 cm, and the image magnification of the (reducing) optical system 44 is 1:4 (0.25×), then the vertical size of the reading area becomes 4 cm (1 cm/0.25), and the lateral size of the reading area 36 becomes 6 cm (1.5 cm/0.25). Thus, the reading area 36 extends beyond the window 31 (area S1) at either side, by 1 cm at each of supplementary reading areas 39a and 39b.

The size and shape of the supplemental reading areas 39a and 39b can be adjusted by modifying the dimensions and arrangement of the light source 41, the optical system 44, and the CCD 43.

Figure 6A:
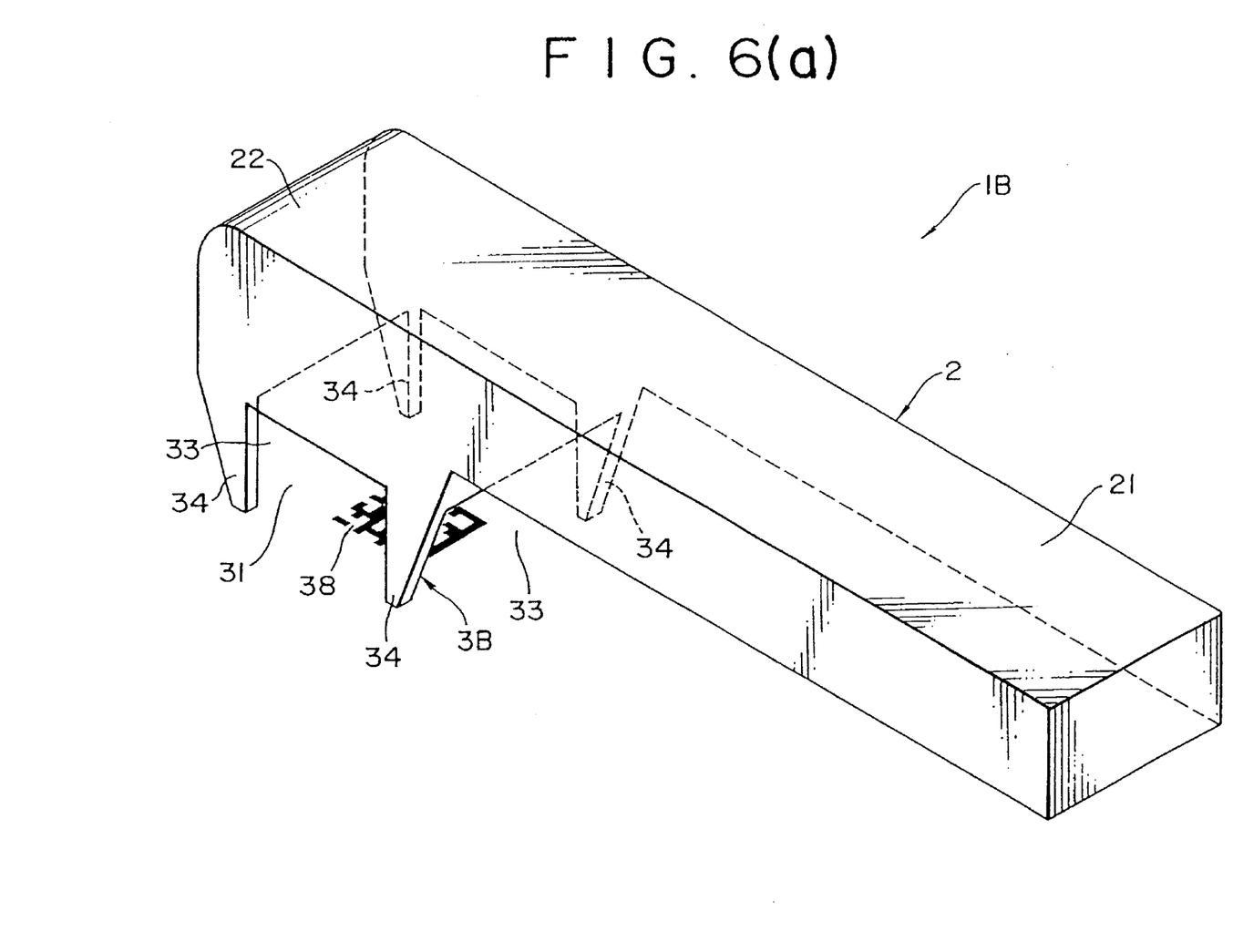
FIG. 6(a) shows an encoded symbol reader according to a third embodiment of the present invention.

FIG. 6(a) shows an encoded symbol reader 1B according to a third embodiment of the present invention. Elements common to the first and second embodiments are shown having the same reference numerals, and are not detailed in the following description of the second embodiment.

As shown in FIG. 6(a), the encoded symbol reader 1B has a main body 2 identical to the main body of the encoded symbol reader 1A. However, a different reading head 3B is attached to the main body 2 of the encoded symbol reader 1B. The reading head 3B includes a reading module 4 as previously described. Furthermore, the reading head 3B has four columnar legs 34 extending therefrom. The legs 34 expose a rectangular window 31 to an operator on all four sides of the reader 1B, through side openings 33. The four legs 34 also define the corners of the rectangular window 31, and include the reading field 36. In this embodiment, the reading field 36 is the same size as the rectangular window 31. However, the reading field 36 may be smaller than the rectangular window 31.

Figure 7A:
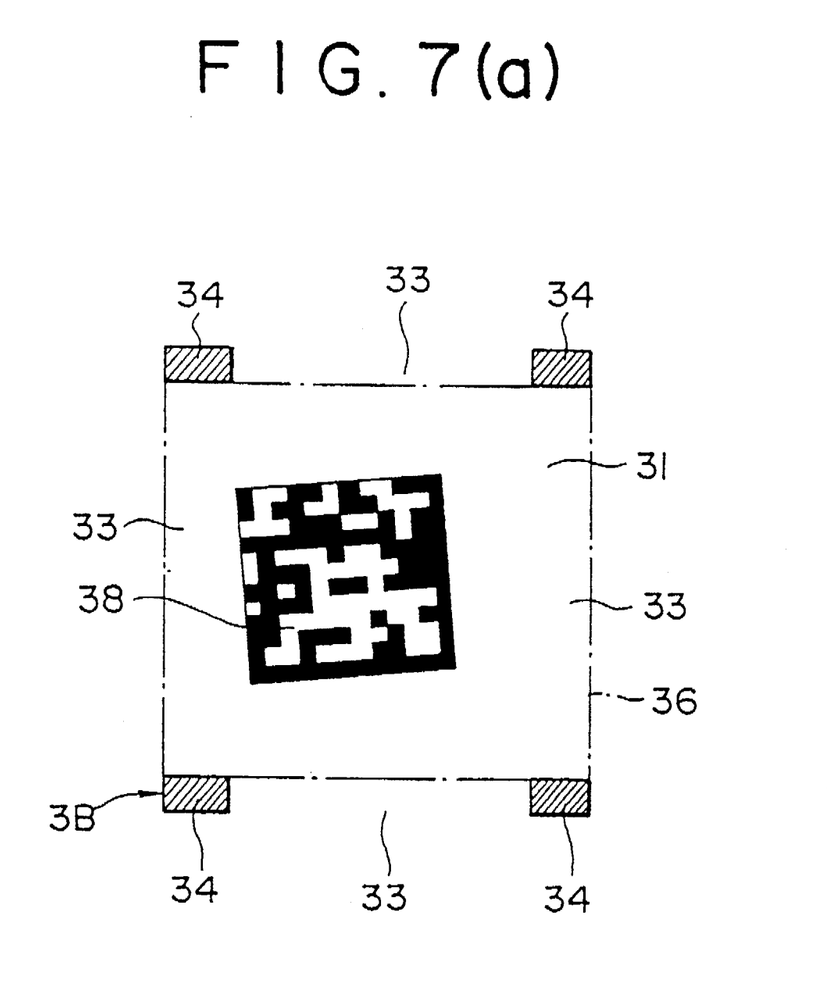
FIG. 7(a) shows a top view of a reading window of the encoded symbol reader of FIG. 6(a) when reading an encoded symbol.

With the above construction, when the encoded symbol reader 1B reads the encoded symbol 38, the tips of the columnar legs 34 are positioned on the reference plane of the encoded symbol 38, ensuring proper focus of an image of the encoded symbol 38 on the CCD 43. Further, proper placement of the encoded symbol reader 1B is ensured since the user can see the encoded symbol 38 between the legs 34 and through the side openings 33. Therefore, the encoded symbol 38 is positioned easily inside the reading field 36 as shown in FIG. 7(a).

Although the use of the columnar legs 34 allows the user to see the encoded symbol 38 when positioning the reader 1B, the user may encounter some parallax error, where it is difficult for the user to detect the boundaries of the cross-shaped window 31a. In this case, a fourth embodiment uses an optical system 44 and CCD 43 arranged such that the reading area 36a extends beyond the cross-shaped window 31a, so that the reading module 4 can read the symbol 38 even when it is outside of the cross-shaped window 31a.

Figure 6B:
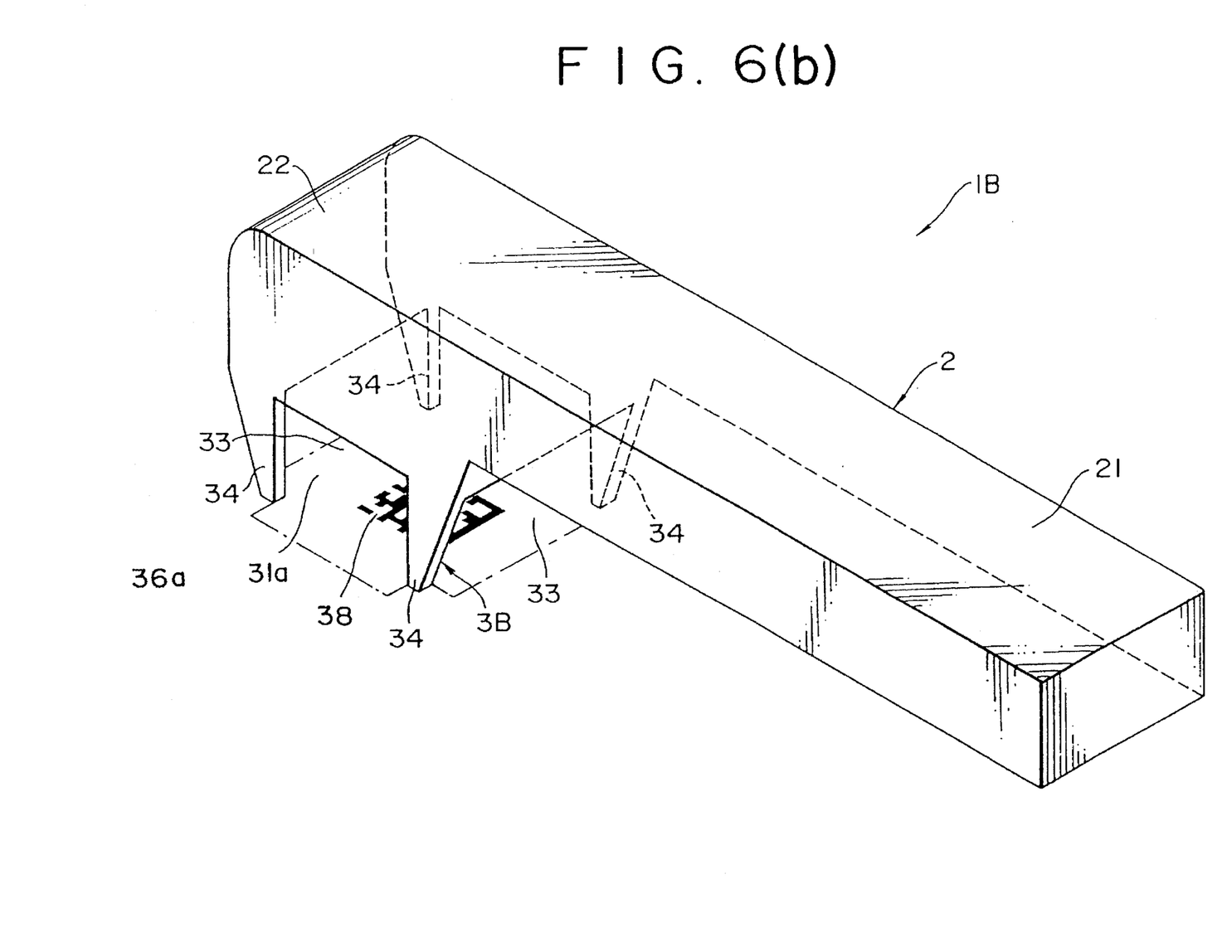
FIG. 6(b) shows an encoded symbol reader according to a fourth embodiment of the present invention.

The fourth embodiment is shown in FIG. 6(b). As shown in FIGS. 7(b), 7(c), 8, and 9, an area S2 is defined by the physical limits between the columnar legs 34. The area S2 corresponds to the size of a cross-shaped window 31a, and is defined by the area enclosed by the legs 34 and the side openings 33, having a normal line corresponding to an optical axis of the optical system 44. The area S2 is shown by the cross-hatched portion of FIG. 8. In the fourth embodiment, the reading field 36a (the sensing area) extends beyond the area S2, and beyond the side openings 34, at supplementary reading areas 39c through 39f (diagonal-hatched portions of FIG. 8). The limits of the reading area 36a, including the supplementary areas 39c through 39f, are further shown in FIG. 8 by lines having a single intermittent dash, while the limits of the cross-shaped window 31a (area S2) are shown by lines having a double intermittent dash.

Figure 9:
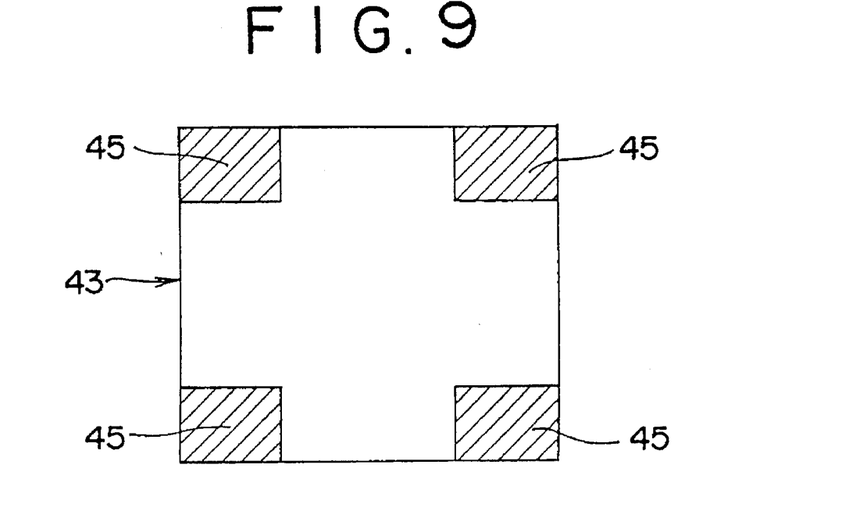
FIG. 9 shows a charge coupled device and masking portions of the encoded symbol reader of FIG. 6(b).

As shown in FIG. 9, in the fourth embodiment, light-shielding mask portions 45 are used to mask the corners of the CCD 43, so that the receiving area only extends beyond the area S2 at the sides of the reading head 3B. The masks 45 allow the reading module 4 to exclude extraneous data, and the uncovered area of the CCD 43 corresponds in shape to the reading area 36a. The contents of picture elements of the CCD 43 masked by the mask portions 45 are stored at predetermined addresses in the memory 12, via the signal processing circuit 5, similarly to the active elements. The data is then sequentially read out from the memory 12 using the address counter of the CPU 15. However, the addresses corresponding to the idle elements are known, so when the ALU of the CPU 15 performs image processing operations, the data corresponding to the mask portions 45 are ignored. Accordingly, the use of the mask portions 45 does not result in processing difficulties. The mask portions 45 are not strictly necessary for the invention to operate, as the idle portions of the CCD 43 may be accounted for by the CPU 15; however, the use of the mask portions 45 is preferable.

Figure 7B:
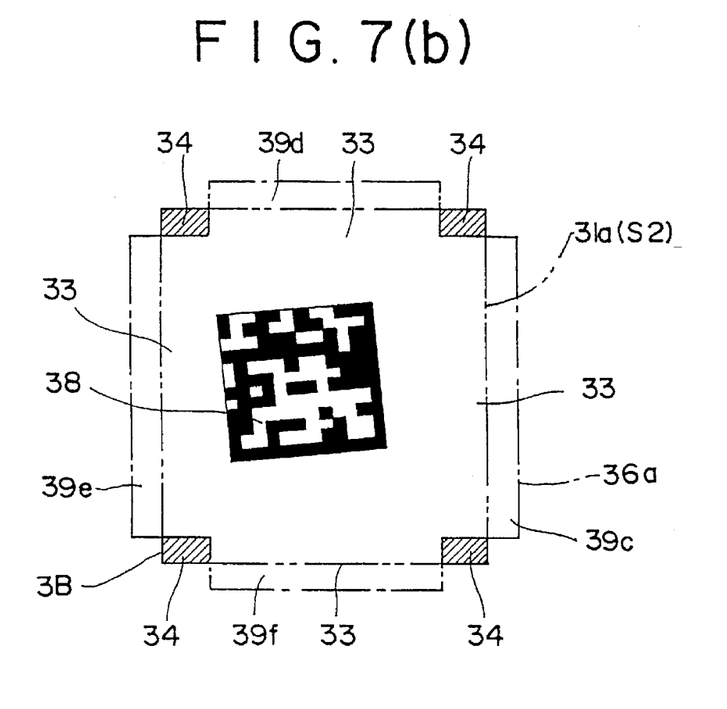
FIG. 7(b) shows a top view of a reading window of the encoded symbol reader of FIG. 6(b) when reading an encoded symbol in a first condition.
Figure 7C:
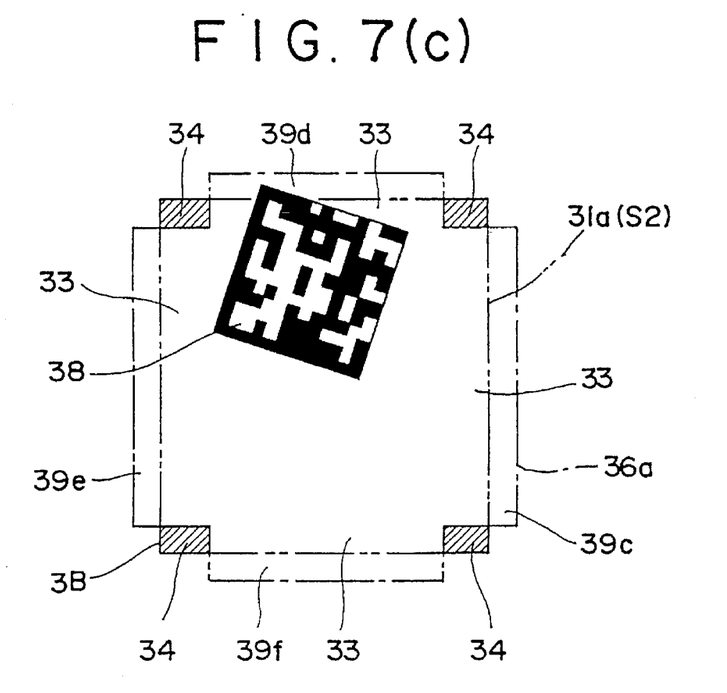
FIG. 7(c) shows a top view of the reading window of the encoded symbol reader of FIG. 6(b) when reading an encoded symbol in a second condition.

In the fourth embodiment of an encoded symbol reader 1B, the encoded symbol 38 is read similarly to the third embodiment as shown in FIG. 7(b). However, the symbol 38 may also be read by the when the encoded symbol is outside the limits of the physical cross-shaped window 31a (area S2), as long as the encoded symbol 38 is at least within one of the supplementary reading areas 39c through 39f, as shown in FIG. 7(c).

Figure 8:
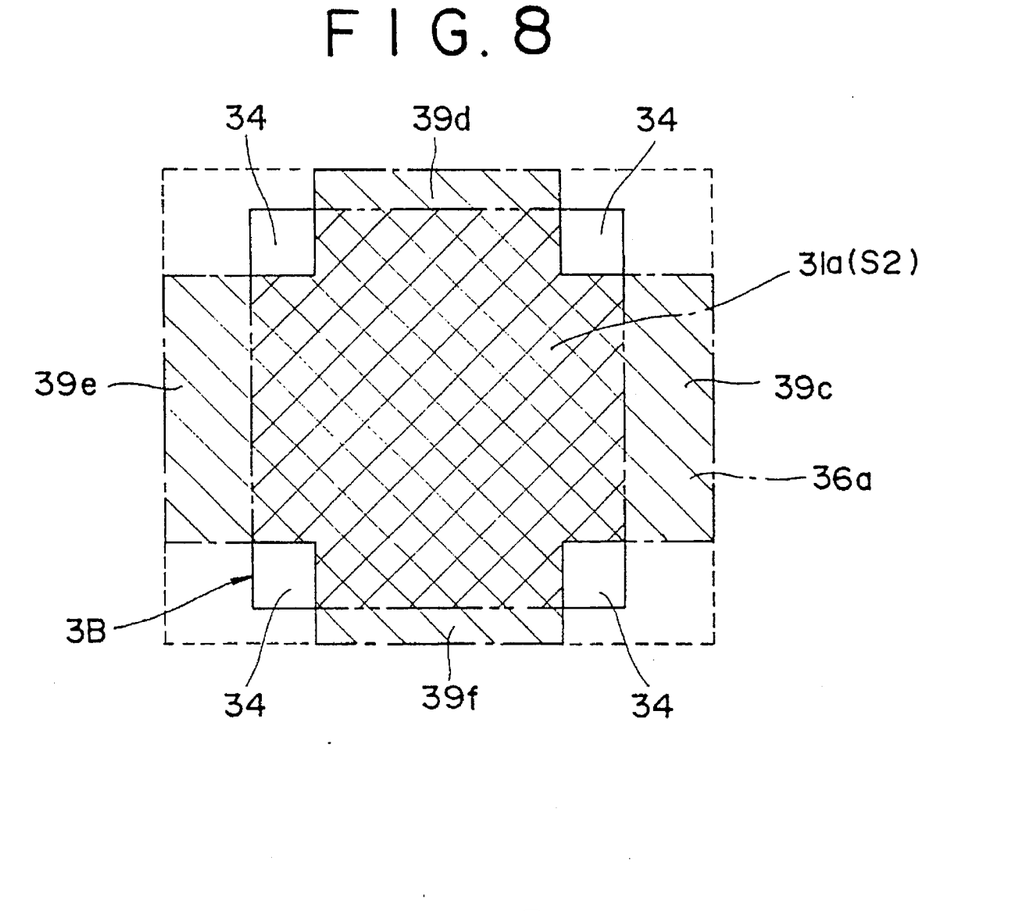
FIG. 8 shows reading areas of the encoded symbol reader of FIG. 6(b)

In the described fourth embodiment, as the reading area 36a extends beyond the physical limits of the cross-shaped window 31a (area S2), it becomes easier to place the reader 1B appropriately. When the mask portions 45 are used, even though the shapes of the symbol reading area 36a and the image receiving area of the CCD 43 are different, the readability of the encoded symbol can be improved.

The reading head 3B of the second embodiment is provided with four free-standing columnar legs 34. However, the cross-shaped window 31a may be more clearly identified by connecting a thin wire, thread or metal strip between adjacent pairs of legs 34, forming a visible rectangular outline of the window 31a.

As described above, the encoded symbol readers 1A and 1B have reading heads 3A and 3B, having ribs 35, 37 and legs 34, respectively. The ribs 35, 37 and legs 34 provide openings 32 and 33, respectively, therebetween. By looking through the spaces 32 or 33 between the ribs 35, 37, or legs 34, the user can easily position the encoded symbol reader 1A or 1B such that the encoded symbol 38 is located within the reading field 36.

The ribs 35, 37 and the legs 34 in the above described embodiments are so shaped that the openings 32, 33 defined therebetween are rectangular; however, the ribs 35, 37 and the legs 34 are not limited to this shape, but may be shaped such that the openings 32 or 33 therebetween are triangular, square oval, circular, hexagonal etc. Further, the number of spaces 32 or 33 therebetween is not limited to two (as with ribs 35, 37) or four (as with legs 34) but may be one, three or more than four. Further, if ribs 35, 37 are used, they may be adjacent to each other as well as opposite to each other, providing openings 32, 32 adjacent to each other.

The outer periphery of windows 31 is also not limited to a rectangular shape but may be any shape. However, the window 31 must be large enough to cover the entire area of the encoded symbol 38.

The present disclosure relates to subject matter contained in Japanese Patent Applications No. HEI 6-096943, filed on Apr. 11, 1994, and No. HEI 07-039055, filed on Feb. 3, 1995, which are expressly incorporated herein by reference in their entireties.

What is claimed is:

1. A symbol reader for reading encoded symbols encoded in two dimensions, said symbol reader comprising:

an imaging system, capable of receiving and decoding an image of an encoded symbol, and said imaging system having a predetermined reading area in which an encoded symbol is readable;

a body, housing said imaging system;

at least one positioning member extending from said body and contactable with a reference surface bearing said encoded symbol, said at least one positioning member defining a predetermined distance between said reference surface and said imaging system when said at least one positioning member contacts said reference surface;

means for extending said reading area outside said body and beyond said at least one positioning member;

wherein said encoded symbol can be read by said imaging system outside said body and beyond said at least one positioning member when said at least one positioning member contacts said reference surface.

2. The symbol reader according to claim 1, wherein said at least one positioning member comprises a pair of parallel elongated ribs, wherein said pair of parallel elongated ribs are spaced from each other to define two openings, said openings being at opposite ends of said pair of parallel elongated ribs.

3. The symbol reader according to claim 2, wherein said reading area extends outside a bounded area defined by said two elongated ribs, and said encoded symbol can be read by said imaging system through both of said openings when said elongated ribs contact said reference surface.

4. The symbol reader according to claim 3, wherein said imaging system further comprises an optical system and an image receiving element; and an amount of extension of said reading area beyond said bounded area is determined by a magnification of said optical system and a shape and size of said image receiving element.

5. The symbol reader according to claim 3, wherein said body includes a handle portion, and wherein said body extends in a plane parallel to said reading area, and said elongated ribs are to parallel first and second sides of said reading area.

6. The symbol reader according to claim 1, wherein said at least one positioning member comprises four parallel positioning members attached to said body, each of said four parallel positioning members being a columnar leg, and wherein said columnar legs define four openings formed between adjacent pairs of columnar legs.

7. The symbol reader according to claim 6, wherein said reading area extends outside said body and beyond a bounded area defined by said four columnar legs, and said encoded symbol can be read by said imaging system through all of said four openings when said four parallel positioning members contact said reference surface.

8. The symbol reader according to claim 7, wherein said imaging system further comprises an optical system and an image receiving element, and wherein an amount of extension of said reading area outside said bounded area is determined by a magnification of said optical system and by a shape and size of said image receiving element.

9. The symbol reader according to claim 8, wherein a portion of said image receiving element of said imaging system is masked to cover unused portions of said image receiving element.

10. The symbol reader according to claim 1,
wherein said imaging system includes a light source and a light receiving element.

11. The symbol reader according to claim 10, further comprising:
a signal processing circuit associated with said light receiving element; and
a light source driving circuit for driving said light source.

12. The symbol reader according to claim 1,
wherein said at least one positioning member defines a predetermined distance from said encoded symbol to said imaging system when said at least one positioning member contacts said reference surface; and
said reading area extends outside said body and beyond said positioning member, such that said encoded symbol can be read by said imaging system outside said body and beyond said at least one positioning member when said at least one positioning member contacts said reference surface.

13. The symbol reader according to claim 12,
wherein said imaging system further comprises an optical system and an image receiving element, and
wherein an amount of extension of said reading area outside said body is determined by a magnification of said optical system and by a shape and size of said image receiving element.

14. The symbol reader according to claim 1,
wherein said at least one positioning member is the only interrupting structure in a field of view of said imaging system; and
when said imaging system can receive a complete image of all portions of said encoded symbol, all portions of said encoded symbol are exposed to an operator's direct view through an opening.

15. The symbol reader according to claim 1, further comprising:
said imaging system including an optical system and an image receiving element, and
an amount of extension of said reading area outside said body being determined by a magnification of said optical system and by a shape and size of said image receiving element.

16. The symbol reader according to claim 15,
wherein said at least one positioning member comprises a pair of parallel elongated ribs attached to said body; and
said pair of parallel elongated ribs defining two openings formed at opposite ends of said pair of parallel elongated ribs.

17. The symbol reader according to claim 16,
wherein said body includes a handle portion, and
wherein said body extends in a plane parallel to said reading area, and said elongated ribs are parallel to said reading area, and said openings expose parallel sides of said encoded symbol.

18. The symbol reader according to claim 15,
wherein said at least one positioning member comprises four parallel positioning members each being in the form of a columnar leg attached to said body, and
wherein said columnar legs define four openings formed between adjacent pairs of columnar legs.

19. The symbol reader according to claim 18,
wherein a portion of said image receiving element of said imaging system is masked to cover unused portions of said image receiving element.

* * * * *